United States Patent [19]
Yablonski

[11] 3,974,434
[45] Aug. 10, 1976

[54] STEPPING MOTOR SIGNAL CIRCUIT
[75] Inventor: Robert E. Yablonski, Orange, Calif.
[73] Assignee: Electronic Engineering Company of California, Santa Ana, Calif.
[22] Filed: Jan. 10, 1975
[21] Appl. No.: 540,290

Related U.S. Application Data
[62] Division of Ser. No. 449,575, March 8, 1974.

[52] U.S. Cl. .............................. 318/696; 318/685
[51] Int. Cl.² ........................................ G05B 19/40
[58] Field of Search ............ 318/696, 685, 138, 254

[56] References Cited
UNITED STATES PATENTS

| | | | |
|---|---|---|---|
| 3,345,547 | 10/1967 | Dunne | 318/138 |
| 3,636,429 | 1/1972 | Jakubowski | 318/685 |

*Primary Examiner*—Robert K. Schaefer
*Assistant Examiner*—John W. Redman
*Attorney, Agent, or Firm*—Harry R. Lubcke

[57] ABSTRACT

A plural phase stepping motor control circuit in which damping is accomplished by energizing a previously energized phase prior to the expiration of the power cycle on a pair of other phases. The duration of the damping pulse is inversely proportional to the speed of operation. The logic involved allows for forward or reverse running. A sprocket latch circuit locks out spurious overshoot responses, such as may be caused by vibration, damaged tape, or other irrationality.

5 Claims, 5 Drawing Figures

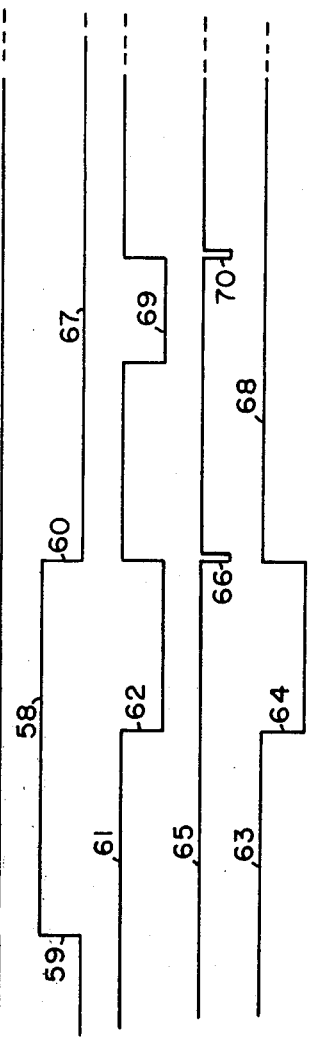
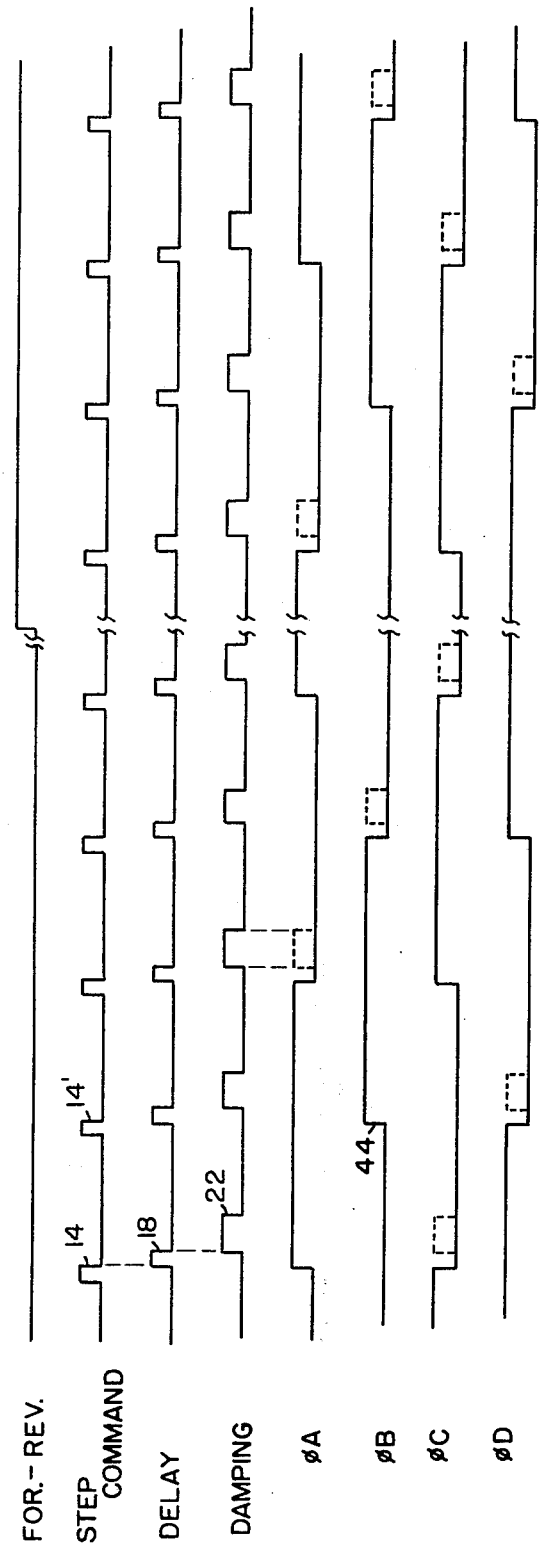
FIG. 3.
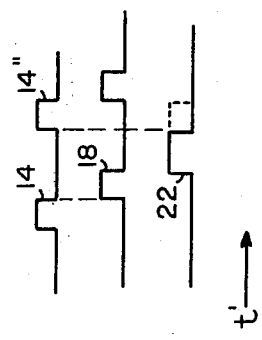
FIG. 5.
FIG. 4.

STEPPING MOTOR SIGNAL CIRCUIT

This is a division of application, Ser. No. 449,575, filed Mar. 8, 1974.

BACKGROUND OF THE INVENTION

This invention pertains to control circuits for stepper motors.

This invention is in the same field as that set forth in U.S. Pat. No. 3,767,993, patented Oct. 23, 1973 by the same inventor. The present circuitry and the mode of operation are; however, clearly different from those of the patent. In the patent, damping was accomplished by momentarily energizing all of the typically three phases of the stepper motor.

The art has employed so-called "retrotorque" pulses, these being briefly applied to a phase of a plural phase stepping motor, that phase being the phase just previously energized. This manner of achieving critial damping has been stated as effective with any number of phases, but has typically been employed with three phase stepping motors. A ring counter is used to provide bi-directional driving pulses for the plural phase motor from a single train of incoming drive pulses, and time delay means are employed for achieving appropriate timing of the retrotorque pulse.

The art has also employed means for applying a braking pulse to a phase winding that had just been previously energized, but has required auxiliary pole pieces and windings on the stepping motor.

The art has also employed the method of accelerating the rotor in the desired direction with a known power pulse, subsequently decelerating it with a retropulse applied to another winding, and then allowing re-acceleration by terminating the retropulse.

BRIEF SUMMARY OF THE INVENTION

The prior art has been uniformly silent upon high stepping rates and has not comprehended the method and apparatus for non-oscillatory stepping at such rates. Certain efforts have required prior knowledge of the imminent cessation of stepping in order to prepare for non-oscillatory stopping at a near-future step. In contrast, the method and apparatus of this invention handles each step de novo, and non-oscillatory stopping can be accomplished on any step.

It has been found that the duration of the retro damping pulse applied to the just-previously energized phase winding of the stepper motor must be inversely proportional to the speed of operation in order for that operation to be more rapid than that of the prior art. Accordingly, there is provided herein means to accomplish this method, in which the damping pulse has zero duration at the maximum stepping rate.

Additionally, a latch circuit is provided, having the quality that only a pulse representative of the first true position of the stepper motor for any one step shall be passed-on to the output circuit of the tape reader or other end-use device. Successive spurious pulses associated with the same step are gated off. Typically, the damping circuit herein causes the stepper motor to perform unambiguously per se, but a paper tape or equivalent having seriously worn sprocket holes, or spurious vibration of the machine may cause repetitive reading; and such is thus prevented.

BRIEF DESCRIPTION OF THE DRAWINGS

FIG. 3 shows a series of time-related waveforms that pertain to the general operation of the circuit.

FIG. 4 shows a fragmentary section of certain of the waveforms of FIG. 3 at a higher pulse repetition rate.

FIG. 5 shows waveforms that pertain to the operation of the latch circuit.

DESCRIPTION OF THE PREFERRED EMBODIMENT

Figure 1:
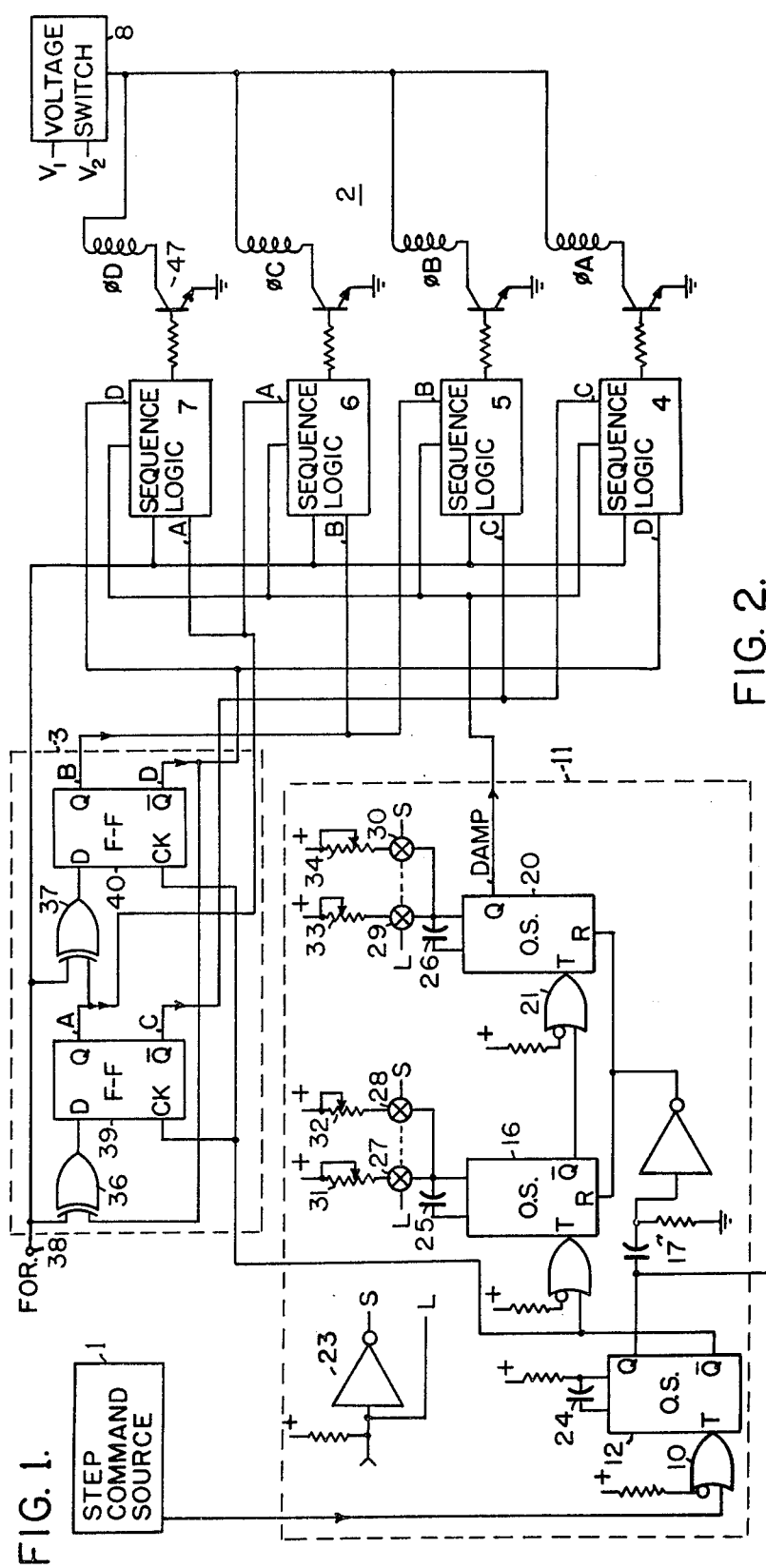
FIG. 1 is a schematic logic diagram of the stepping motor damping control circuit.

In FIG. 1, block 1 represents a source of step command pulses. This may be a known pulse oscillator, which may be under manual or computer control; or it may be any other source of pulses, such as output pulses from a computer or other electronic device of the system of which the stepper motor is a part.

Stepper motor 2 is of the plural phase type. Four phases are shown as illustrative, represented by stator coils $\phi A$, $\phi B$, $\phi C$, $\phi D$. Suitably timed pulse trains for each of these coils, for stepping in either direction, are provided by the logic means within dotted rectangle 3; a phase counter, and individual sequence logic 4, 5, 6, 7, respectively, associated with each coil, and detailed in FIG. 2.

The damping or retro pulse required to be timely applied to the phase last energized at any particular instant is formed by the logic within dotted rectangle 11.

The sprocket latch logic, which allows only the first true position response from the device for one step command to the stepping motor, is contained within dotted rectangle 9 in FIG. 1. This response may also be interpreted as an unambiguous encoded motor position signal.

An additional element that is required for superior rapid performance is voltage switch 8. This raises the voltage of the power pulse from a low value that is employed when the stepper motor is resting to a high value for accelerating to the next step. This device was detailed in dotted rectangle 8 of the previously mentioned Yablonski U.S. Pat. No. 3,767,993.

Considering the circuit of FIG. 1 in detail, the pulses from step command source 1 pass into an OR gate 10 that is associated with one-shot 12. This one-shot relaxation device provides a short duration output pulse, shown at 14 in FIG. 3. Pulse 14' is the next succeeding pulse when the step rate has a nominal intermediate value. Pulse 14'' is the next succeeding pulse when the step rate is at or near its maximum value, and this is shown in FIG. 4.

The duration of pulse 14 is of the order of 130 microseconds ($\mu$s) for the illustrative embodiment chosen herein. This is for a four-phase stepper motor of the variable reluctance type, having a 15° step and an impedance of the order of 18 ohms. Such motors are available from Computer Devices Corporation, or from the IMC corporation. For a relatively low high-voltage increment from means 8 the duration of pulse 14 may be shorter; for a high increment it must be longer, possibly up to twice as long.

One-shot 12 is available commercially, as the Fairchild integrated circuit 9602 DC. It is retriggerable and resettable.

One-shot 12 operates upon an input pulse from source 1 going positive, when the trigger level of typically 2 volts is reached. The output at Q then goes to a logic "one" and remains there for a period of time determined by the time constant of the one-shot.

The upper gate 10 terminal is tied to plus 5 volts in order to activate the lower terminal to pulses from source 1. The Q̄ output of one-shot 12 enters the gate part of one-shot 16. The Q output of the same enters differentiating means 17.

One-shot 16 is employed for delay purposes; this also being the acceleration period of the motor. This one-shot is adjusted to give an output pulse at Q̄ of approximately 800 µs duration. As connected, this pulse starts at the temination of pulse 14 from one-shot 12 and is pulse 18 of FIG. 3.

Essentially as before, the Q̄ output from one-shot 16 enters the T terminal of one-shot 20 through OR gate 21. The other input to gate 21 is connected to plus 5 volts to enable the input of one-shot 20.

The Q output from one-shot 20 is damping pulse 22 of FIG. 3. It starts at the temination of delay pulse 18 and has a duration in the range of from 1 to 3 milliseconds (ms). The value chosen for this duration depends upon the conditions imposed upon the motor; i.e., the inertial load, the friction load, the drive voltage, etc. Damping pulse 22 enters each sequence logic 4, 5, 6, 7 to be available for control by phase counter 3.

Capacitors 24, 25, 26 connect to supply terminals of one-shots 12, 16, 20, respectively, and determine the period of the respective one-shot pulses. These capacitance values may be 0.05, 0.8, 0.3µfd, respectively.

In the cases of the 16 and 20 one-shots, the pulse widths are preferably arranged to have two values, depending upon the open or closed position of switches 27 & 28, 29 & 30, respectively. This is to accommodate two conditions of transport associated with the stepper motor; such as for paper tape, the conditions of a loop of tape, or of a longer length of tape requiring spools or reels, as known to the art. For the spooling mode a shorter damping pulse may be used, since the spools (reels) exert a damping effect of themselves.

Each pair of switches may be of the electronic MOSFET type, or of the simple mechanical type. The requirement is that when one is open the other is closed. Each switch is of the single-pole single-throw type.

Associated with each switch and in series with an operating supply voltage for the one-shot of say 5 volts, is a time-constant adjustable resistor. Resistor 31, for the loop mode, may have a typical adjusted value of 30,000 ohms, while resistor 32, for the spool mode, may have a typical adjusted value of 40,000 ohms. The reverse is true for resistors 33 and 34, which may have values of 40,000 and 30,000 ohms, respectively. Circuit 23 actuates the MOSFETS from a manual control.

Differentiating means 17 may be comprised of a series capacitor having a capacitance of the order of 1,000 picofarads and a shunt resistor of the order of 220 ohms resistance. An inverter buffers the differentiated signal, which signal is then conveyed to the reset terminals R of one-shots 16 and 20. The inverter may be one part of a 7400 series integrated circuit of the TTL type, such as the MC7404.

A brief negative spike differentiated pulse is obtained for each leading edge of command pulse 14. When the next pulse is slow in coming, as 14', the normal durations of pulses 18 and 22 have been completed and the differentiated pulse has no effect. However, when the next pulse occurs quite rapidly, as at 14'', say at a rate of 418 pulses per second, the differentiated pulse occurs before the expiration of the normal duration of the damping pulse. The damping pulse 22 is thus terminated by the resetting of one-shot 20 at an earlier than normal time.

Fragmentary FIG. 4 illustrates this situation. The scale of time for this figure is for higher frequency command pulses 14. What would be a normal duration damping pulse has been shortened by the amount shown dotted. As the command pulse rate increases, the differentiated pulse occurs earlier and earlier. This shortens pulse 22 until it is finally eliminated, as at 460 steps per second.

The output from differentiator 17 is also applied to the reset terminal of delay one-shot 16, and at still higher stepping rates pulse 18 therefrom is shortened and in the limit may also be eliminated. This prevents the one-shot from being retriggered, which would destroy the sequence.

The above-detailed functioning of the apparatus of logic 11 provides a highly desirable mode of accomplishing damping. The duration of the damping pulse is suited to the stepping rate and so fidelity of stepping motion is provided over a wide range of from slow to rapid stepping rates.

In this invention, damping of the stepper motor is accomplished by introducing the damping pulse for a brief period during the latter part of the next step to only the one winding that had just been previously energized. This functioning is accomplished by coaction between phase counter 3 and the individual sequence logics for each phase; i.e., 4, 5, 6, 7.

In phase counter 3, exclusive OR gates 36 and 37 are conditioned for forward or reverse running by the upper input of each being connected to a "FOR"ward terminal 38. This is representative of a manually operated direction control, which gives a logic voltage level of plus 5 volts for forward and 0 volts for reverse, as an example. A logic "one" (plus 5 volts) on the Forward line causes the counter to count down; i.e., for the stepper motor to run forward.

The output of OR gate 36 enters the D terminal of D type flip-flop 39 and the output of exclusive OR gate 37 enters the D terminal of D type flip-flop 40.

Inverted command pulses 14 from the Q̄ terminal of one-shot 12 enter the clock "CK" inputs of flip-flops 39 and 40 to provide actuating pulses for the counter. The Q output of flip-flop 39 becomes the second input to exclusive OR gate 37 and the Q̄ output of flip-flop 40 becomes the second input to exclusive OR gate 36. The Q and Q̄ outputs of both flip-flops are the phase counter outputs for the four individual sequence logics 4, 5, 6, 7.

Figure 2:
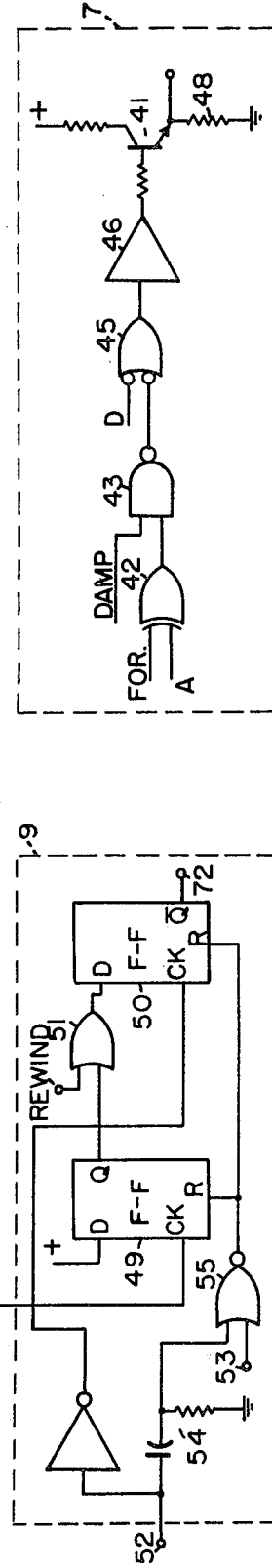
FIG. 2 is the detail of sequence logic that is employed plural times in FIG. 1.

In FIG. 2, exclusive OR gate 42 has a FORward input; which is either logic "one" or logic "zero" depending upon the direction of rotation. When phase D is driving the stepper motor the phase A input is also used as a control in the forward direction for inserting damping. The output of this exclusive OR gate becomes one input to AND gate 43, the other input to which is the "damping" pulse input from one-shot 20.

To add the damping pulse to the phase that has just been turned off with a bidirectional counter, only the clamping pulses and the phase outputs are needed. As an example, the circuit takes the next phase; i.e., phase B, waveform 44 in FIG. 3 and uses that to logically AND gate the damping into phase A. The same is true of phases B, C, D. In the count down mode the phase insertion is reversed; i.e., phase B is used to gate phase C. An exclusive OR gate is thus used on the input of the sequence logic. The following phase C is really the inverted phase of A, $\overline{A}$. The exclusive OR gate is programmed to change the input signal A into $\overline{A}$ by the FORward command.

Further in FIG. 2, the output of gate 43 enters an input of NOR gate 45, the other input of which is the phase D timed pulse from phase counter 3. This output enters buffer amplifier 46, which may be a CD4050AE CMOS driver gate coupled to transistor 41 to provide drive capability. Transistor 41 may be a 2N2222 transistor having a drive limiting resistor connected to the base of the order of 500 ohms, a collector resistor of the order of 220 ohms feeding from a positive voltage supply of the order of 5 volts. The emitter to ground output, or shut-off, resistor 48, has typically a resistance value of 100 ohms.

The output therefrom is connected to the base of power transistor 47 through a drive limiting resistor. This transistor may be an NPN type 2N4347. The emitter thereof is connected directly to ground. The collector is connected in series with stepper motor stator coil $\phi D$ to a common connection for all such coils to the energizing means associated with voltage switch 8. Equivalent connections are made for the other three phases.

Further in FIG. 1, in the sprocket latch logic 9, clock pulses, which are the step command pulses 14 of FIG. 3 at the output of one-shot 12, are entered into the "CK" input of flip-flop 49, of the D type. The Q output therefrom enters the D input of flip-flop 50 via OR gate 50. The latter is interposed to also accept a "rewind" signal upon this status being imposed upon the apparatus. This is to inhibit the latching logic during rewinding paper tape, to take an example from a typical application of the stepper motor and control circuit of this invention.

The "sprocket signal" is incoming at terminal 52 and is derived from the response of a paper tape reader to perforations in the tape. It clocks the output of flip-flop 49 into flip-flop 50 at the "CK" terminal. This is performed on the negative-going edge of the signal, which indicates that the reader is going off of that character.

The waveforms of FIG. 5 indicate the performance of the latch circuit. The step command pulse 14 is shown in the upper waveform. The Q terminal output of flip-flop 49 is shown as waveform 58, having a set positive-going excursion at 59. The negative-going excursion 60 has been referred to above. The sprocket signal 61 has a negative-going excursion at 62, upon the sprocket hole being sensed. This sets the $\overline{Q}$ level of flip-flop 50 shown as waveform 63, at the negative-going excursion at 64.

Additionally, each sprocket signal is differentiated by differentiator 54, comprised of a series capacitor of perhaps 1,000 picofarads capacitance and a shunt resistor of 220 ohms resistance. A "system reset" input is provided at terminal 53. This is a "power up" reset circuit to be found in another portion of the use apparatus, such as a tape reader. A 5 volt pulse is provided. It is used to properly set flip-flops 49 and 50 upon the apparatus being turned on by the operator.

These alternate inputs are passed by NOR gate 55 to the reset terminals R of both flip-flops 49 and 50.

The differentiator output is waveform 65 in FIG. 5, with the differentiated pulse being 66. When pulse 66 resets the flip-flops, waveform 58 goes low, at 67, and waveform 63 again goes high, at 68.

Any overshoots of the sprocket signal caused by an actual overshoot of the paper tape or equivalent is shown as negative excursion 69 of waveform 61 in FIG. 5. This is a spurious response and is not wanted in the performance of the apparatus. Another differentiated pulse 70 is formed upon the positive-going excursion at the end of 69, but this has no effect on flip-flops 49 and 50. Waveform 67 of flip-flop 49 is still low and waveform 68 of flip-flop 50 is still high and so no change in state can occur. This is still true though there should be more than one overshoot 69. Only after the next clock pulse 14, which occurs at the right of this waveform and beyond what is shown, will another and valid sprocket waveform excursion be allowed to pass.

The output of sprocket latch logic 9 appears at terminal 72, which is the $\overline{Q}$ terminal of flip-flop 50. This goes to the "use" circuit of the tape reader or equivalent and is not employed in other parts of the control circuit of this invention.

I claim:
1. A circuit for deriving a signal unambiguously definitive of the steps of a stepper motor (2),
   which motor has means to produce an electrical sprocket signal that is related to the steps of said motor, comprising;
   a. a step command source (1) to provide stepping pulses (14) to drive said stepper motor,
   b. means to electrically differentiate said sprocket signal (54), and
   c. an electronic latch circuit (49,50) having relaxation elements constituted to pass only the first impulse (62) of said sprocket signal,
   whereby a spurious repeat signal associated with a given step is not passed.
2. The circuit of claim 1 in which said relaxation elements comprise;
   a. an initial flip-flop (49) to accept stepping pulses (14),
   b. a secondary flip-flop (50) to accept said first impulse (62),
   c. a connection to said initial flip-flop for actuation of said secondary flip-flop thereby, and
   d. a connection to said differentiator (54) to reset said initial and secondary flip-flops,
   whereby only said first impulse is passed by said flip-flops despite a subsequent signal
   until such time as another stepping pulse is impressed upon said initial flip-flop.
3. The control circuit of claim 1 which additionally includes;
   a. first gate means (51) to selectively accept a logic signal to inhibit the actuation of said latch circuit (9).
4. The control circuit of claim 1 which additionally includes;
   a. second gate means (55) to selectively accept a logic signal to reset said relaxation elements.
5. The method of deriving a signal unambiguously definitive of the steps of a stepper motor which includes the method steps of;
   a. forming a pulse signal related to the termination of each of the said steps,
   b. impressing said signal upon relaxation logic,
   c. electrically differentiating said pulse signal,
   d. resetting said relaxation logic with the electrically differentiated said pulse signal, and
   e. thereby forming only one electrical response for a given step of the motor regardless of inertial effects otherwise forming a spurious second response.

* * * * *